P. B. DELANY.
TELEGRAPHIC KEYBOARD TRANSMITTING APPARATUS.
APPLICATION FILED FEB. 5, 1906.

957,312.

Patented May 10, 1910.

WITNESSES:

Max B. A. Doring.
L. L. Browning.

INVENTOR
Patrick B. Delany

BY
Edward C. Davidson

ATTORNEY

P. B. DELANY.
TELEGRAPHIC KEYBOARD TRANSMITTING APPARATUS.
APPLICATION FILED FEB. 5, 1906.

957,312.

Patented May 10, 1910.
5 SHEETS—SHEET 3.

WITNESSES:

INVENTOR
Patrick B. Delany
BY
Edward C. Davidson
ATTORNEY

UNITED STATES PATENT OFFICE.

PATRICK B. DELANY, OF SOUTH ORANGE, NEW JERSEY.

TELEGRAPHIC KEYBOARD TRANSMITTING APPARATUS.

957,312.  Specification of Letters Patent.  Patented May 10, 1910.

Application filed February 5, 1906. Serial No. 299,514.

*To all whom it may concern:*

Be it known that I, PATRICK B. DELANY, a citizen of the United States, residing at South Orange, county of Essex, State of New Jersey, have invented certain new and useful Improvements in Telegraphic Keyboard Transmitting Apparatus, of which the following is a description.

This invention comprises an organization wherein, on depression of a key in the keyboard, electrical circuit contacts requisite for formation or transmission of the corresponding signal are established in advance of the actuation of a circuit controlling device whose function is to make effective each such preliminarily established contact for transmission of a signal or component part of a signal. Stating the matter more specifically the organization comprises an arrangement of multiple branch circuits, each in series with a controlling device at which they are, in succession, closed and opened. The signal to be made or transmitted is formed by closing the required branches to the signal circuit in advance of the actuation of the controlling device. In the form in which the invention is herein shown and particularly described, the controlling device has a contact maker or trailer traversing a series of insulated contact pieces to each of which one of the branch circuits is electrically connected. The branch circuits include a series of contact bars, shown as parallel, and the signal forming contacts are carried upon a series of endwise movable contact making bars arranged at right angles to the parallel branch circuit bars, and of which there is one for each letter or signal to be formed. Each one of the series of parallel branch circuit bars, when a signal forming contact is brought into connection with it, furnishes the circuit for transmission of a dot signal. To transmit a dash a succession of two, three, or more of such bars are connected into the circuit, and as the trailer of the controller bridges the contact pieces traversed by it, such prolonged closure of the circuit is thereby effected as may be desirable for the transmission of a dash. Spaces are formed between the component parts of a signal by leaving on open circuit one or more of the branch circuit bars lying between those which are connected on either side for formation of successive component parts of a signal.

There are various other important features, all hereinafter described—such, for instance, as the locking of a key-lever, when depressed, until the signal is completed, and then automatic release of the key-lever, and automatic return of it and the circuit controller to normal or initial position.

The invention is susceptible of being embodied in various forms that may be devised by those skilled in such matters. The accompanying drawing shows one embodiment of it that experience has shown to be particularly efficient in operation and of economical and substantial construction.

Figure 2:
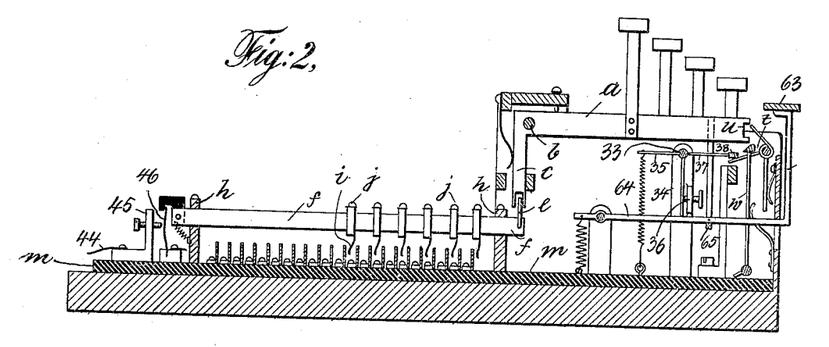
Fig. 2, a cross section on the line 2, 2, of Fig. 1, the key, seen in elevation, being in its normal raised position.

The various key-levers *a* are equipped with upturned finger pieces bearing representations of the respective characters of letters to be transmitted. The key-levers may be appropriately pivoted upon a bar *b* and each may have a downward bifurcated extension *c*, between the arms of which extends an upright piece *e* on the end of a horizontal bar *f* sliding in supports or standards *h*, arranged respectively adjacent its opposite ends. On each such bar *f* are mounted contact pieces *i* the details of construction of which are shown in Figs. 2 and 4. Each consists of a yoke embracing the bar *f*, adjustably clamped thereon by a set screw *j* and having the downward projecting contacts *i*. There is one such key-lever and endwise movable bar *f* and associated parts for each character or letter to be transmitted. Beneath the series of parallel bars *f*, and at right angles thereto, are a series of parallel branch circuit contact plates *k*. When the bar *f* is in normal position,—that is, when its key-lever is raised the contact pieces *i* stand between the contact plates *k* (Figs. 2 and 6) but when a key lever is depressed (Fig. 3) the bar *f* is moved endwise and brings the contact pieces which it carries into contact with the branch circuit plates *k*. These plates are each insulated, being as shown in Fig. 2 independently mounted upon a plate *m* of insulating material; and they are consecutively connected by circuit connections *n* to consecutively arranged insulated contacts numbered 1 to 21 inclusive. The endwise moving bars are all in electrical connection with the frame,— that is to say, as shown in the diagram (Fig. 6) with the rear guide plate or standard *h* in which they slide, and to insure good electrical connection spring contacts *d* are arranged to bear against the bars. The segments 1 to 21 are traversed by reciprocating contact maker trailer or brush *o* which in normal position rests upon a dead segment at the beginning of the series of segments and is carried by a radial arm *p* projecting from an insulated vertical rotatable shaft *q*. This shaft is connected by wire *r* with one pole of a local battery *l b*, the other pole of which is connected through the winding of an electromagnet, relay or transmitting device *s*, and thence the circuit extends to the frame of the instrument or standard *h* and through it to the series of endwise movable bars *f*. If the key-lever *a* (Fig. 6) be depressed, its endwise moving bar *f* will be urged to the right and the contact pieces *i* thereon will be carried against the sides of the branch circuit contact plate *k*.

Figure 1:
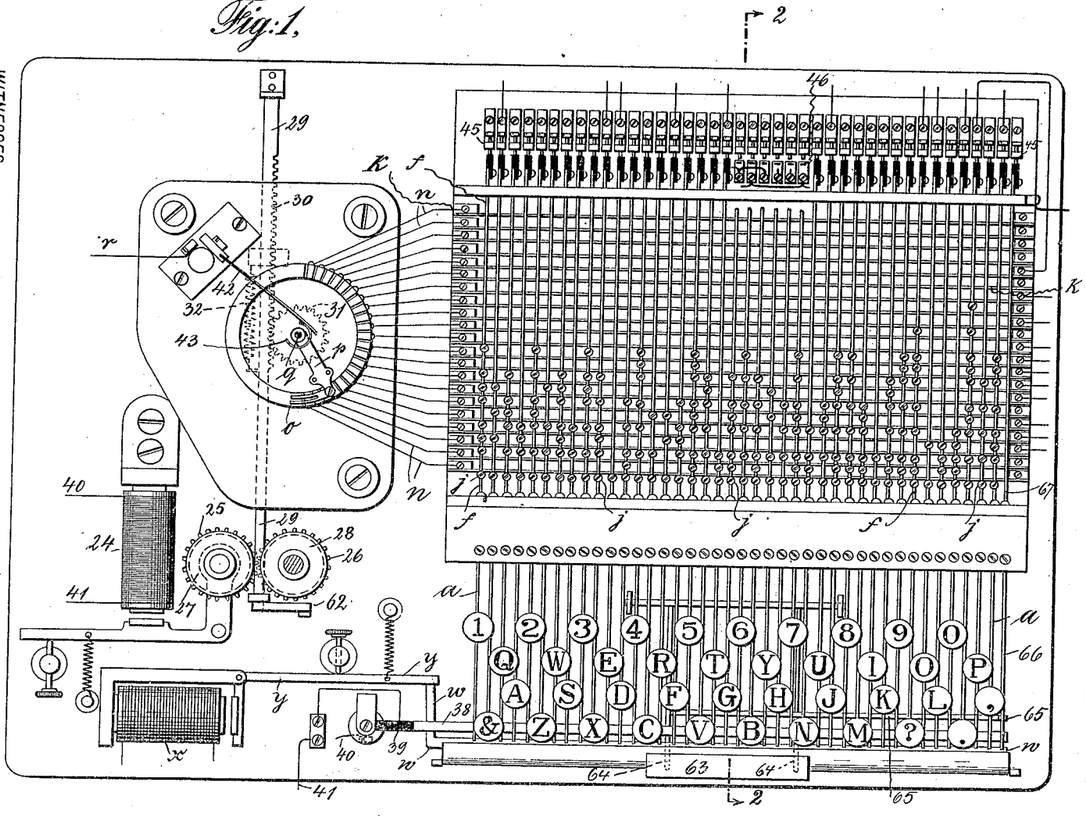
Figure 1 is a plan view.
Figure 6:
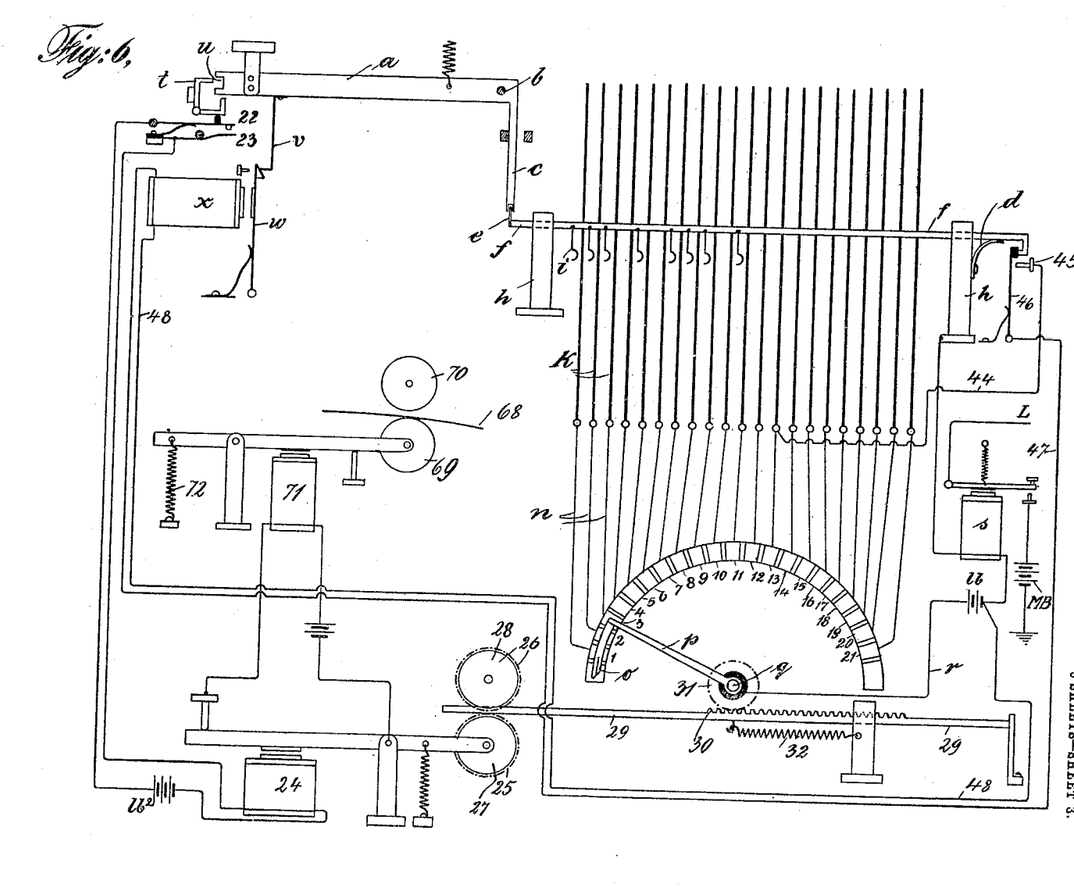
Fig. 6, a diagram indicating the general operation of the system.

Fig. 6 shows the bar *f* as equipped with eight contact pieces *i* arranged as follows: The first three make contact with the first three branch circuit plates; there is no connection with the fourth branch circuit plate, but the next contact piece makes contact with the fifth branch circuit plate; there is no contact with the sixth plate, but there is with the seventh, eighth and ninth; none with the tenth, but there is with the eleventh. If, now, the trailer *o* be set in motion and is so constructed as to bridge from one contact segment to another a circuit will be maintained while it is passing over segmental contacts 1, 2, 3 and during this time, which may represent a suitable interval for a dash signal, the relay *s* will be energized, its armature lever attracted and current from a generator or main battery M B will be sent to line L. Since the branch circuit plate connected with contact 4 has no contact piece *i* bearing upon it, it is dead and therefore the circuit will be opened at segment 4, and the armature lever of *s* will come to its back stop but will be again attracted when trailer *o* is on contact 5 for a briefer interval representing a dot. It will be opened again at 6 and be restored while the trailer is passing segmental contacts 7, 8 and 9. It will be opened again at segment 10 and restored at segment 11 for a brief interval representing a dot. Thus, there will have been transmitted either into the main transmission circuit L, or into a local circuit which may be represented also by L, the signals representing letter J of Morse code, *i. e.*, dash—dot—dash—dot. The behavior of the various parts of the apparatus may be as follows: When the key-lever is depressed, it strikes one arm of a pivoted yoke *t* which is of a length equal to the width of the keyboard, and rocks its upper edge into engagement with notches *u* in the ends of the undepressed key-levers thereby locking against depression all the key-levers except the one then in operation. At the same time, a downwardly extending hook *v* on the key-lever engages a pivoted spring pressed latch *w* (Fig. 6); or latch *w* may, as in Figs. 2 and 3, engage the shoulder of the recess *u* in the end of the key-lever. This latch *w* is of a length corresponding with the width of the keyboard and carries at one end the armature of an electromagnet *x* which, when energized as presently described, withdraws the latch and permits the key-lever under the stress of its retractile spring to return to normal elevated position. This is as shown in the diagram Fig. 6. As illustrated in the plan view Fig. 1, the latch *w* has at one end a right angle projection extending rearwardly and which, when magnet *x* is energized, is struck by the extended end of the armature lever $y$ thereof, the latch being forced back out of engagement with the key lever. The depression of the key-lever $a$ brings into electrical connection two insulated contacts 22, 23, thereby closing the circuit of a local battery $l\ b^2$ through the coil of a magnet 24, the armature lever of which carries an idler gear 25 meshing with a continuously driven gear 26 (Figs. 1, 5 and 6). Turning with these gears are grooved rolls 27, 28, the grooving being shown V-shaped and between them is an endwise movable bar 29 square in cross section, and formed with rack teeth 30 meshing with a gear 31 on the trailer shaft $q$. A coiled spring 32 acts normally to hold the bar 29 in retracted position with trailer $o$ upon the dead segment at the beginning of the series of segments. When the magnet 24 is energized, the roll 27 carried by its armature lever is forced toward the roll 28 so that the bar 29 is frictionally grasped between them and is, by the action of the continuously driven gear 26 and its roll 28, drawn forward causing rotation of shaft $q$ and traverse of the trailer over its table of contacts. The insulated contacts, marked 22, 23, in the diagram (Fig. 6), are shown somewhat differently arranged in Figs. 1, 2, 3 and 15. Beneath the gang of key-levers is arranged a rock shaft 33 turning in standards 34 arranged respectively at or near opposite sides of the series of key-levers. This rock shaft has at one or more points a rearwardly extending arm 35 to which is applied a tension spring (Fig. 3) and a downwardly extending arm coöperating with an adjustable stop 36 mounted in a projection on one of the standards. It has also two or more forwardly projecting arms 37 in the ends of which is mounted a bar 38 extending under all the key-levers and projecting at one side of the series of key-levers, its end there being equipped with a block 39, of insulating material on the under side of which is secured the contact 22. As the key-lever is depressed, it strikes the bar 38 which in turn presses upon the lower plate or member of the rocking yoke $t$ to bring the upper end of the yoke into the notches in the ends of the undepressed key-levers as already described. The bar 38, when thus pressed down, presses the contact 22 upon the contact 23 and the circuit of magnet 24 is closed.

In Fig. 1, the circuit wires for the magnet 24 are marked 40, 41, and the wire $r$ from local battery $l\ b$ (Fig. 6) is connected to an insulated post carrying a spring arm 42 that bears upon a segmental piece 43 carried by the trailer concentrically to its axis.

Automatic return of the trailer to normal position may be effected by spring 32 when bar 29 is released from the grip of driving rolls 27, 28. It is so released on deënergization of magnet 24 which occurs on separation of contacts 22, 23, on the rise of a key-lever, the signal corresponding to which has been transmitted. The return of the key-lever to normal position is effected by its retractile spring that becomes operative to that end when the latch devices $v$, $w$ (diagram Fig. 6) are disengaged: or, when the latch $w$ is disengaged from the recess in the end of the key-lever, Fig. 3. This operation is effected by energization of magnet $x$ whose armature in Fig. 6 is shown as carried by latch $w$; or, as in Fig. 1, where the end of the armature lever $y$ when the magnet is energized strikes a projection at one end of the latch bar $w$ and throws it to the front out of engagement with the recess in end of the depressed key-lever. This operation is effected on completion of transmission of the signal in the following manner, referring, for instance, to Fig. 6. For the purpose of releasing the trailer and allowing it to move backward to normal position after completion of the last dot forming a component part of the letter J, which is completed when the trailer is upon segment 11, the branch circuit bar connected with that segment, or some succeeding bar, and as shown in Fig. 6, the second succeeding bar, connected to segment 13, is also connected by wire 44 with an insulated contact 45 arranged adjacent the end of the endwise movable contact piece carrying the bar $f$ which in normal position holds away from contact 45 an insulated spring contact 46 which, when the bar is moved on depression of the key, passes into electrical engagement with contact 45 thereby completing a circuit which may be traced from segment 13 by wire 44 contacts 45, 46 and wire 47 to magnet $x$ from whence the circuit is by wire 48 through local battery $l\ b$ and then by wire $r$ to trailer $p$. Consequently, when the trailer reaches contact 13, this circuit is closed, magnet $x$ is energized, the depressed key is released, contacts 22, 23 are separated, magnet 24 deënergized and the armature lever of the latter carries grooved pulley 27 out of engagement with bar 29 which, now, under stress of spring 32, returns to normal position driving the trailer in reverse direction to its normal position. All bars $f$ are provided with corresponding insulated contacts 45, 46, and the branch circuit contact bar through which the last component part of the signal, whatever it may be, is completed, or some succeeding branch circuit bar, is connected to its corresponding insulated contact 45 as already described.

Figure 3:
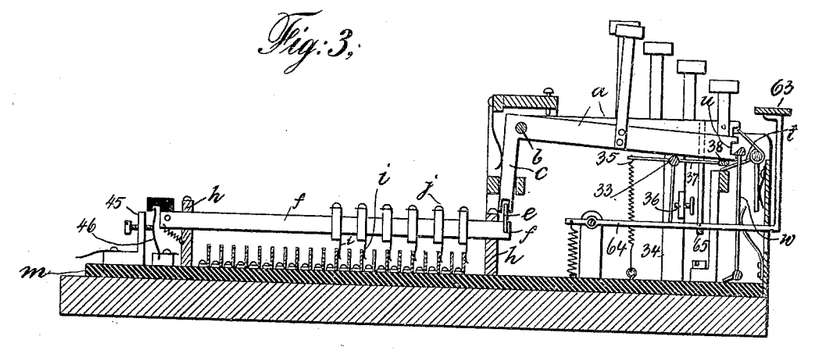
Fig. 3, a view on the same section line showing the key depressed.
Figures 4, 5, 15:
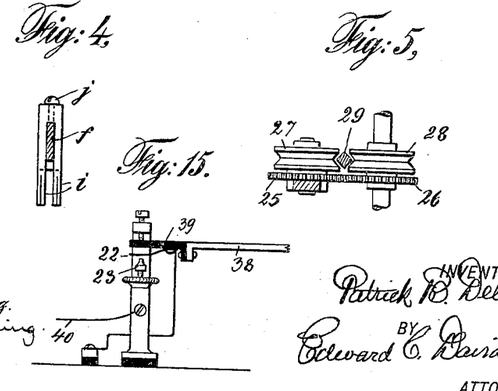
Fig. 4, a detail view showing one of the signal forming contact pieces mounted upon its carrying bar, the latter being shown in section.
Fig. 5, a detail view showing the devices for driving the circuit controller which acts after the signal forming contacts have been set.
Fig. 15, a detail view showing the contacts that are closed on depression of a key to effect movement of the circuit controller from normal position.

Figs. 1 and 3 show the insulated contacts 45 and 46, a suitable manner of mounting them, and an insulated block on the end of the bar $f$ that normally holds 46 out of contact with 45, but permits these contacts to come together when the bar $f$ is moved on depression of the corresponding key.

Figure 7:
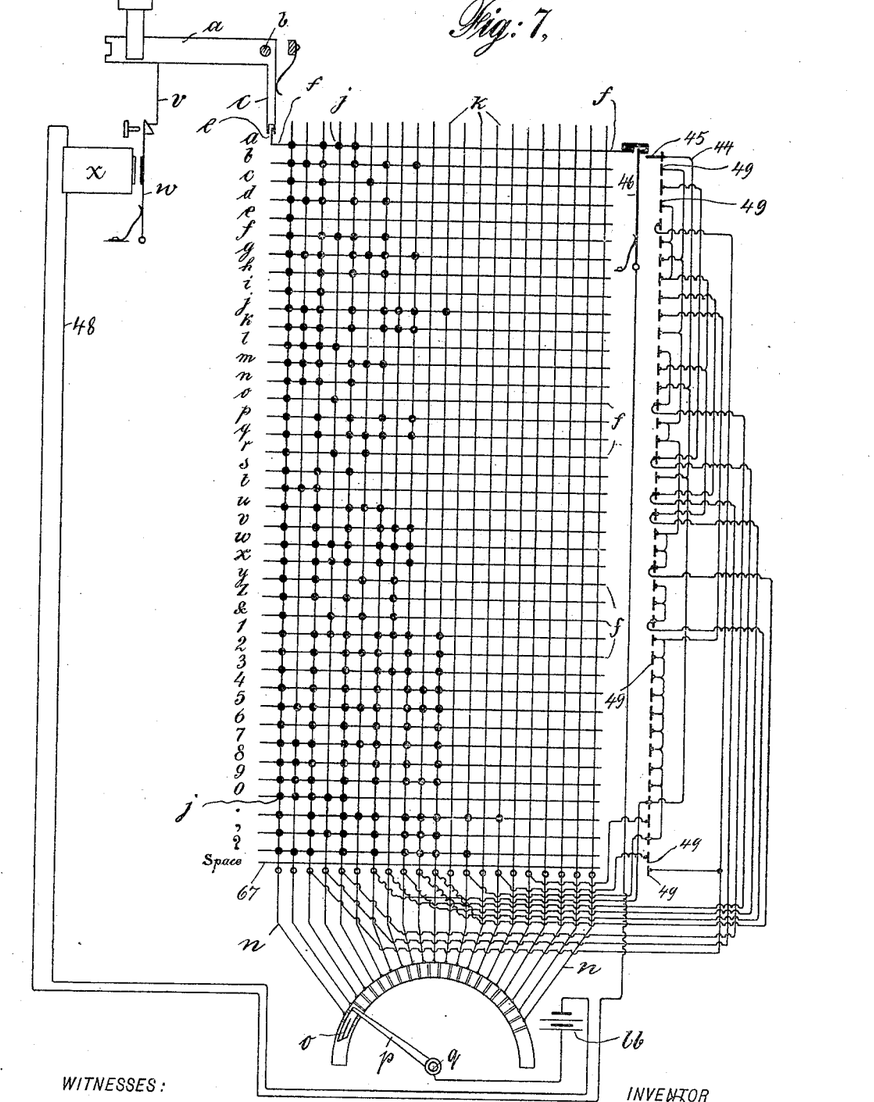
Fig. 7, a diagram showing the branch circuits and contacts required to make up the various letters and characters of the Morse code; and also the circuit connections and contacts by means of which are effected release of a locked depressed key after the corresponding signal is completed, and also automatic return of the circuit controller to normal position.

The diagram view, Fig. 7, shows, according to the Morse code, the contacts between branch circuit plates $k$ and the endwise movable contact carrying bars $f$ required for the formation of the various letters of the alphabet, the character "&", and numerals 1 to 9 inclusive, cipher, period, comma and interrogation point. The black dots indicating such connections may be taken to be the screw heads $j$ appearing in Fig. 4. This diagram also shows the connections for effecting the release by energization of magnet $x$ after completion of formation of the respective signals. The various terminal pieces marked 49 in this diagram are to carry a contact piece 45 with which, as described, is to coöperate a contact 46. It is unnecessary to trace the circuits for each character as they are plainly disclosed by the diagram and to do so would be mere repetition.

Figures 8, 9, 10, 11, 12, 13, 14:
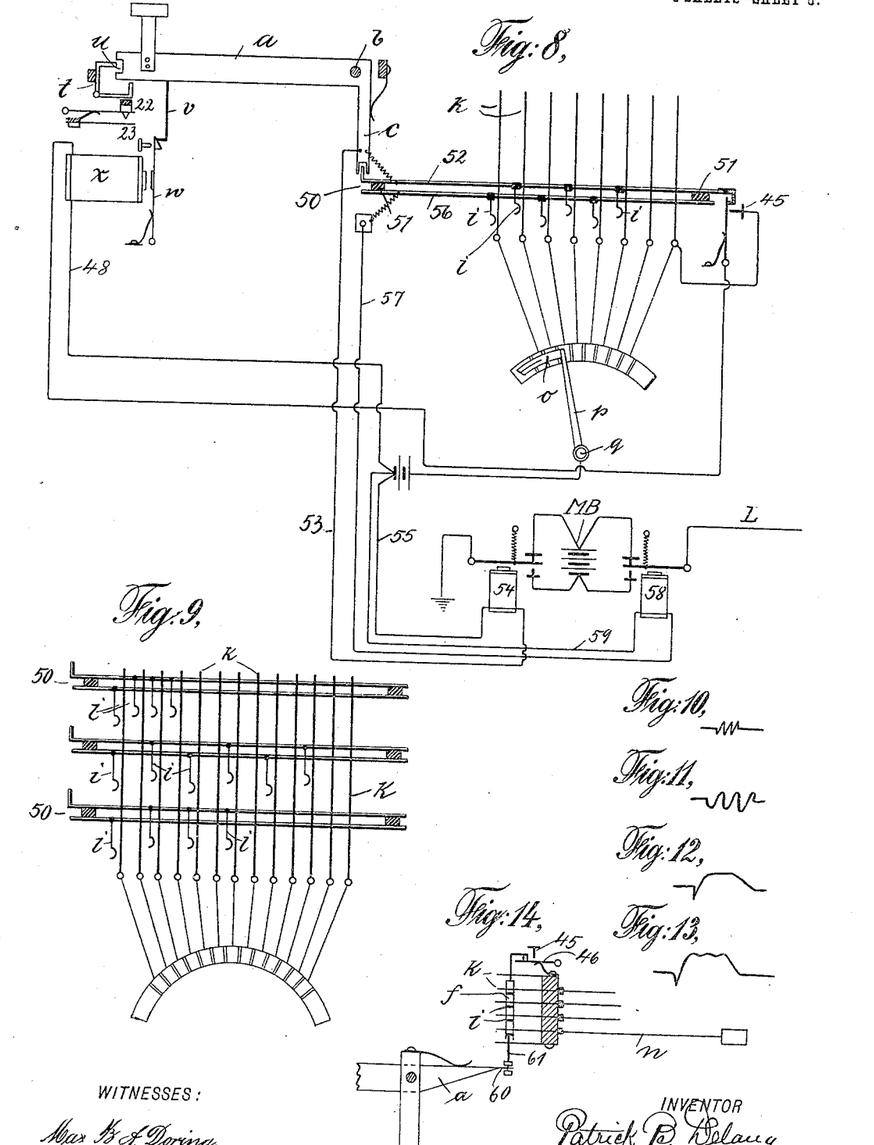
Figs. 8 and 9 are diagrams showing the application of the system to cable transmission.
Figs. 10 and 11, represent cable records of a semicolon transmitted by the continental code according to the two ways of arranging the signal forming contacts illustrated in Figs. 8 and 9.
Figs. 12 and 13, show like records of letter B when transmitted in the two ways shown in Fig. 9.
Fig. 14, is a detail view of diagrammatic character, illustrating a manner of operating the signal forming contacts on the depression of a key lever, the arrangement differing somewhat from that illustrated in Figs. 2 and 6.

Figs. 8 and 9 show the application of this system of key-board transmission to cable working. Parts corresponding with those already described are similarly lettered. Each endwise movable bar $f$ of Fig. 6 is now replaced by a composite bar 50 composed of two metal conducting plates separated and insulated from each other by blocks of insulating material 51. Each conducting strip of the bar carries contact pieces $i$ which coöperate with branch circuit bars $k$. The operation is as already described in all respects except that the two insulated conducting strips forming part of the endwise moving bar 50 carry individual contact pieces $i$. One of these conducting strips 52 is connected by wire 53 through the coil of transmitter magnet 54 from whence the circuit is by wire 55 through the local battery to trailer $o$. The other conducting strip 56 is connected by wire 57 through the coil of another transmitter magnet 58 and thence by wire 59 through the local battery to the trailer. L is the line and M B a main battery or generator connected with pole changer devices of ordinary character so that impulses of alternating polarity are sent to line. The drawing shows the arrangement for transmission of a semicolon, according to the continental code, this character being composed of three positive and three negative dot impulses, the cable record being shown in Fig. 10. If, as in Fig. 9, the contact pieces $i$ are connected with alternate branch circuit contact bars $k$, the record of the signal would be more as shown in Fig. 11.

In Fig. 9, I have also shown contacts on the upper bar 50, for transmitting to line a current of one polarity succeeded by three impulses of current of opposite polarity for the formation of letter J of the continental code, the contact pieces $i$ being designed to make electrical contact with four successive branch circuit bars. The character of the record of the transmission of such a signal would be as in Fig. 12 there being little or no definition of the three successive dots which would be represented by the length of the record line. Such records are easily read by skilled cable operators. If greater definition should be desired, as indicated, for instance, in Fig. 13, then, as shown in connection with the lower bar 50 in Fig. 9, the contact pieces $i$ may be arranged to make contact with alternated branch circuit bars.

Fig. 14 indicates another way of operating the endwise movable contact carrying bars $f$. Here the end of the lever $a$ carries an apertured blade 60 through which passes a rod 61 connected with the bar and carrying nuts on each side of the blade 60. In this illustration, it is contemplated that the endwise movable bar shall be lifted vertically.

The longest character of the Morse code is the period. It requires fifteen of the twenty-one contacts shown, and as the contact for releasing the key is, in the special scheme illustrated, the second one following the last signal contact, that character requires seventeen contacts. If the continental code be used, its longest characters, i. e., 5, exclamation point and apostrophe will each require nineteen contacts and therefore twenty-one contacts have been shown in the drawings. There may, of course, be more than twenty-one contacts and branch circuits, or less, according to the purpose for which the instrument is to be employed. If desired, and in some cases it will be quite satisfactory, the transmitting relay $s$ may be dispensed with. In such cases transmission may be direct into the line from a generator connected to the trailer the line being connected to standard $h$.

To provide against the possibility, remote as it may be, of failure of the devices 45, 46, to act to effect automatic release and return to normal position of the trailer, key and associated parts after transmission of a signal is completed, it is provided that when the trailer has completed its maximum excursion it shall be disconnected from its driver and retracted by its spring. Thus in Fig. 1 the trailer driving bar 29 is so arranged that when the trailer has traversed its maximum distance, the end 62 of the bar strikes against the armature lever $y$ causing it to forcibly act on latch w to release the depressed key and positively open circuit of magnet 24.

The use of a space key is desirable, although not necessary. The drawings, Figs. 1, 2 and 3 show such a key 63. It is carried upon arms 64 pivoted under the bank of key levers, and has a laterally extending arm 65 that when the space key is depressed carries down the space lever 66 located at the extreme right of the series of key levers. The lever 66 operates its endwise movable bar 67 which is in all respects the same as the bars f except that it does not carry contact pieces. It does however control contacts 45, 46, the same as the other bars do and its contact 45 is, Fig. 7, connected to contact 3 of the table of contacts. Thus to make a space the trailer, on depression of space key 63, will move to contact 3 and then be automatically released in the manner already described.

In Fig. 6 there has been indicated diagrammatically one use of the apparatus in addition to transmission,—that is, for making a local record on a tape. The local recording apparatus may be of any of the types known in the art such as an ink recorder, or devices for punching, embossing, or perforating a tape. 68 may be taken to indicate a tape traveling between feed rolls 69, 70, the latter of which is continuously driven, and the former carried upon the armature lever of a magnet 71 whose circuit is open and closed as a magnet 24 is energized and deënergized. When the circuit is open spring 72 carries roll 69 toward roll 70 and the tape is then drawn forward. Electrically operated perforating or recording devices acting upon the tape may be connected with the contacts of relay s, as is well understood and as shown in patents granted to me.

The drawings and foregoing description exemplify the principle of operation of this invention, but it is not intended to limit it as to its structure or to the particular appliances and exact details of operation described. The principles of the invention are applicable not only to direct transmission in the general manner described but also to transmission of signals in wireless or space telegraph systems: for use, locally, for making a record as, for instance, by perforation of a tape to be used for transmission in automatic or machine rapid telegraph system; and in other relations for other purposes for transmission of signals or control electrically of apparatus, for instance for printing telegraphs and selective signaling devices. So far as signal transmission is concerned, it is, of course, adapted to any code whether the transmitted signals be composed of component parts represented by impulses of long and short duration, of uniform duration, or variable polarity since obviously the contact devices may, in any case, be readily arranged to serve the desired purpose.

I claim as my invention:

1. A key board transmitter comprising transmitting keys, one for each character or letter, a series of insulated contacts each having an individual circuit connection, contacts controlled by each key and circuit connections such that when a key is depressed the insulated contacts are connected in groups for the formation of the letter or character corresponding with the key depressed, a contact brush, means whereby, on depression of a key, the brush is caused to successively contact with those of the insulated contacts connected in circuit for the formation of the signal corresponding with the depressed key and means, acting after the completion of the signal, to restore the normal relation of the brush and series of insulated contacts by movement of one of said parts in such direction that the insulated contacts pass the brush in an order the reverse of that occurring when the signal is transmitted.

2. A key board transmitter comprising transmitting keys, one for each character or letter, a series of insulated contacts each having an individual circuit connection, contacts controlled by each key and circuit connections such that when a key is depressed the insulated contacts are connected in groups for the formation of the letter or character corresponding with the key depressed, a contact brush, means whereby, on depression of a key, the brush is caused to successively contact with those of the insulated contacts connected in circuit for the formation of the signal corresponding with the depressed key and electro-magnetic devices connected with an insulated contact beyond those connected for formation of the signal said electro-magnetic apparatus operating to effect restoration of the brush and series of contacts to normal relation.

3. A key board transmitter comprising transmitting keys, one for each character or letter, a series of insulated contacts each having an individual circuit connection, contacts controlled by each key and circuit connections such that when a key is depressed, the insulated contacts are connected in groups for the formation of the letter or character corresponding with the key depressed, a contact brush, means whereby, on depression of a key, the brush is caused to successively contact with those of the insulated contacts connected in circuit for the formation of the signal corresponding with the depressed key, electro-magnetic devices connected with an insulated contact beyond those connected for formation of the signal said electro-magnetic apparatus operating to effect restoration of the brush and series of contacts to normal relation and mechanically acting means serving to control the circuit of said electro-magnetic devices after the brush has traversed all the contacts and thereby insuring retraction of the brush to normal position.

4. A key board transmitter comprising transmitting keys, one for each character or letter, a series of insulated contacts each having an individual circuit connection, contacts controlled by each key and circuit connections such that when a key is depressed, the insulated contacts are connected in groups for the formation of the letter or character corresponding with the key depressed, a contact brush, a spring whose reaction tends to hold the brush in normal relation to the series of contacts, means whereby, on depression of a key, the brush is caused to advance against the tension of said spring to successively contact with those of the insulated contacts connected in circuit for the formation of the signal corresponding with the depressed key and means acting after the completion of the signal to release the brush to be retracted to normal position by its spring.

5. A key board transmitter comprising transmitting keys, one for each character or letter, a series of insulated contacts each having an individual circuit connection, contacts controlled by each key and circuit connections such that when a key is depressed, the insulated contacts are connected in groups for the formation of the letter or character corresponding with the key depressed, a contact brush, a spring whose reaction tends to hold the brush in normal relation to the series of contacts, means whereby, on depression of a key, the brush is caused to advance against the tension of said spring to successively contact with those of the insulated contacts connected in circuit for the formation of the signal corresponding with the depressed key and electro-magnetic means connected with an insulated contact beyond those connected for the formation of the signal and acting to release the brush which is then retracted by its spring.

6. A key board transmitter comprising transmitting keys, one for each character or letter, a series of insulated contacts each having an individual circuit connection, contacts controlled by each key and circuit connections such that when a key is depressed the insulated contacts are connected in groups for the formation of the letter or character corresponding with the key depressed, a contact brush, means whereby, on a depression of a key, the brush is caused to successively contact with those of the insulated contacts connected in circuit for the formation of the signal corresponding with the depressed key, means acting after the completion of the signal to restore the normal relation of the brush and series of insulated contacts by movement of one of said parts in such direction that the insulated contacts pass the brush in an order the reverse of that occurring when the signal is transmitted, means for locking the respective keys when depressed until the signal is formed and means for automatically effecting return of a depressed key to normal position after the signal has been formed.

7. A key board transmitter comprising transmitting keys, one for each character or letter, a series of insulated contacts each having an individual circuit connection, contacts controlled by each key and circuit connections such that when a key is depressed the insulated contacts are connected in groups for the formation of the letter or character corresponding with the key depressed, a contact brush, means whereby, on depression of a key, the brush is caused to successively contact with those of the insulated contacts connected in circuit for the formation of the signal corresponding with the depressed key, means acting after the completion of the signal to restore the normal relation of the brush and series of insulated contacts by movement of one of said parts in such direction that the insulated contacts pass the brush in an order the reverse of that occurring when the signal is transmitted, and means for locking all except a depressed key while the latter is depressed.

8. A key board transmitter comprising a series of branch circuit contacts, a table of insulated contact pieces respectively connected with such branch circuit contacts, a series of keys one for each character or letter to be formed, contacts controlled thereby, means whereby such contact devices are operated on depression of a key to establish connection with branch circuit contacts to thereby connect the contacts of the table of contacts in proper series or groups for formation of the character represented by the depressed key, means for then automatically advancing the controller across the table of contacts to such extent as to effect formation of said character and means then acting automatically to cause the controller to move backward to normal position.

9. A key board transmitter comprising a series of branch circuit contacts, a table of contact pieces respectively connected with the branch circuit contacts, a trailer adapted to traverse the table of contacts, a series of keys, contact devices controlled thereby, means whereby such contact devices are operated, on depression of a key, to establish connection with the branch circuit contacts for effecting formation of the character represented by the depressed key, means for automatically on the depression of a key causing the circuit controller to traverse the table of contacts, an electro-magnet connected with one of the contacts in the table of contacts, its circuit that is completed by the trailer when the character represented by the depressed key has been transmitted, and means controlled by said electro-magnet to automatically effect return of the trailer, the depressed key and contacts controlled by the latter to normal position when the character represented by the depressed key has been transmitted.

10. A key board transmitter comprising branch circuits, a table of contacts with which the branch circuits are connected, a trailer adapted to traverse the table of contacts, transmitting keys, a series of devices having contacts coöperating with the branch circuit of contacts and acting on the depression of a key to establish connection with such branch circuit contacts to effect formation of the signal represented by the key, normally separated contacts closed on depression of a key and connected in a circuit with one of the contacts of the table which in each case the trailer traverses upon completion of the signal represented by the depressed key, an electro-magnet in said circuit, means whereby on the depression of a key the trailer is moved from normal position across the table of contacts, and means controlled by said electro-magnet whereby on completion of transmission of the character represented by the depressed key the trailer is returned to normal position.

11. A key board transmitter comprising a table of contacts, a trailer adapted to traverse them, a series of parallel branch circuit plates each connected to a corresponding contact in the table, a series of parallel endwise movable bars arranged at right angles to said contact plates, contact pieces carried thereby and arranged on movement of the bar endwise to make contact with certain of the branch circuit plates, a key one for each endwise movable bar, means whereby on depression of a key its corresponding endwise movable bar is actuated to bring its contacts against the branch circuit contact plates and means whereby the trailer is then moved from normal position to traverse the table of contacts and so transmit the character represented by a depressed key.

12. A key board transmitter comprising a table of contacts, a trailer adapted to traverse them, a series of parallel branch circuit plates each connected to a corresponding contact in the table, a series of parallel endwise movable bars arranged at right angles to said contact plates, contact pieces carried thereby and arranged on movement of the bar endwise to make contact with certain of the branch circuit plates, a key for each endwise movable bar, means whereby on depression of a key its corresponding endwise movable bar is actuated to bring its contacts against the branch circuit contact plates, means whereby the trailer is then moved forward from normal position to traverse the table of contacts and so transmit the character represented by a depressed key, and means for automatically moving the trailer backward to normal position when transmission of the character represented by a depressed key is completed.

13. A key board transmitter comprising a series of insulated equally-spaced contact pieces of uniform width, keys, one for each character or signal to be transmitted, contact devices and circuit connections controlled by the keys whereby contacts of the series are connected in groups to represent the character or letter corresponding with the depressed key, a line contact, and means for automatically causing it to traverse the series of contacts to such extent as to make contact with the groups of contacts thereof.

14. A key board transmitter comprising the combination with a movable contact maker of a single series of equally-spaced insulated contact pieces of uniform width over which said contact maker is adapted to traverse, an individual circuit connection for each of the insulated contact pieces, keys representing letters or characters to be transmitted and means controlled by said keys for electrically grouping the contacts in said series to correspond with the character represented by a depressed key.

15. In a telegraphic transmitter the combination of a keyboard and key levers, the line circuit, sets of electric contacts arranged in series, each of which sets is adapted to be connected to the line circuit by the operation of a key lever, and each set of contacts corresponding to a signal, a transmitting device having divisions corresponding with the said sets of contacts, a reciprocating contact brush traversing the transmitting device, and circuits and connections so devised and arranged that signals corresponding to the particular key levers operated are automatically transmitted over the line.

16. In a telegraphic transmitter, the combination of a keyboard and key levers, the line circuit, series of contacts adapted to be connected to the line circuit by movement of the key levers, each series corresponding to a signal or character, a transmitting device having divisions, corresponding in number to the number of separate series of contacts on the keyboard, a reciprocating brush traversing the transmitting device, circuits and connections between the series of contacts and the divisions of the transmitting device, means separate from the key levers for actuating said transmitting device, and said key levers being connected to control the operation of the actuating means for the transmitting device.

17. In a telegraphic transmitter a line circuit, the combination of key levers, a series of conductor plates insulated from each other, a number of sets of contacts arranged in series, each set adapted to connect electrically a different combination of the conductor plates to said line circuit and a switch or brush adapted to reciprocate over said conductor plates and means controlled by said key levers for actuating said brush.

18. In a telegraphic transmitter the combination of the keyboard and key levers, the line circuit, a transmitting device, comprising a table of contacts and a reciprocating contact brush, a number of sets of contacts arranged in series, each set adapted to be connected to the line circuit by the movement of a key lever, circuits from said contacts to the transmitting device, and means controlled by said key levers for actuating said device.

In testimony whereof, I have hereunto subscribed my name.

PATRICK B. DELANY.

Witnesses:
 L. L. BROWNING,
 EDWARD C. DAVIDSON.